US008941302B2

(12) United States Patent
Hikmet et al.

(10) Patent No.: US 8,941,302 B2
(45) Date of Patent: Jan. 27, 2015

(54) LIGHT-EMITTING ARRANGEMENT WITH ORGANIC PHOSPHOR

(75) Inventors: Rifat Ata Mustafa Hikmet, Eindhoven (NL); Johannes Franciscus Maria Cillessen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/877,668

(22) PCT Filed: Oct. 3, 2011

(86) PCT No.: PCT/IB2011/054327
§ 371 (c)(1),
(2), (4) Date: Apr. 4, 2013

(87) PCT Pub. No.: WO2012/046175
PCT Pub. Date: Apr. 12, 2012

(65) Prior Publication Data
US 2013/0200782 A1 Aug. 8, 2013

(30) Foreign Application Priority Data
Oct. 6, 2010 (EP) .................................... 10186654

(51) Int. Cl.
*H01L 51/50* (2006.01)
*H05B 33/04* (2006.01)
(Continued)

(52) U.S. Cl.
CPC .............. *H05B 33/04* (2013.01); *C09K 11/06* (2013.01); *F21K 9/56* (2013.01); *F21V 31/005* (2013.01); *H05B 33/10* (2013.01); *C09K 2211/1007* (2013.01); *C09K 2211/1011* (2013.01);
(Continued)

(58) Field of Classification Search
USPC .................................. 313/504, 512; 428/690
See application file for complete search history.

(56) References Cited

U.S. PATENT DOCUMENTS 6,197,218 B1 * 3/2001 Hampden-Smith et al. ...................... 252/301.4 R
6,593,687 B1 7/2003 Pei
(Continued)

FOREIGN PATENT DOCUMENTS

| EP | 0227980 A2 | 7/1987 |
|---|---|---|
| GB | 876311 A | 8/1961 |
| WO | WO2009024512 A1 | 2/2009 |

OTHER PUBLICATIONS

Sircar S et al., "Activated Carbon for Gas Separation and Storage", Carbon, Elsevier, Oxford, GB, vol. 34, No. 1, Jan. 1, 1996, pp. 1-12, XP004022388.

Primary Examiner — Mary Ellen Bowman
(74) Attorney, Agent, or Firm — Yuliya Mathis

(57) ABSTRACT

The invention provides a light-emitting arrangement comprising: a light source adapted to emit light of a first wavelength; a wavelength converting member comprising an organic wavelength converting material adapted to receive light of said first wavelength and to convert at least part of the received light to light of a second wavelength, said wavelength converting member and said light source being mutually spaced apart; and a sealing structure at least partially surrounding said wavelength converting member to form a sealed cavity containing at least said wavelength converting member, the gas pressure within said sealed cavity being $1*10^{-5}$ bar (1 Pa) or less. At such pressure, the organic phosphor has been found to have particularly good stability, thus resulting in a longer life time of the phosphor.

15 Claims, 3 Drawing Sheets

(51) Int. Cl.
  *C09K 11/06* (2006.01)
  *F21K 99/00* (2010.01)
  *F21V 31/00* (2006.01)
  *H05B 33/10* (2006.01)
  *F21V 3/00* (2006.01)
  *F21Y 101/02* (2006.01)
  *F21Y 103/00* (2006.01)

(52) U.S. Cl.
  CPC . *C09K2211/1029* (2013.01); *C09K 2211/1044* (2013.01); *F21K 9/135* (2013.01); *F21V 3/00* (2013.01); *F21Y 2101/02* (2013.01); *F21Y 2103/003* (2013.01)
  USPC .......................... 313/512; 313/504; 428/690

(56) References Cited

U.S. PATENT DOCUMENTS

| | | |
|---|---|---|
| 2003/0160188 A1 | 8/2003 | Tazaki |
| 2007/0273274 A1 | 11/2007 | Horiuchi |
| 2010/0244670 A1 | 9/2010 | Nomura |

\* cited by examiner

LIGHT-EMITTING ARRANGEMENT WITH ORGANIC PHOSPHOR

FIELD OF THE INVENTION

The present invention relates to a light-emitting arrangement comprising an organic phosphor maintained under a controlled environment, a method for the production thereof, and to a lamp comprising such light-emitting arrangements.

BACKGROUND OF THE INVENTION

Light-emitting diode (LED) based illumination devices are increasingly used for a wide variety of lighting and applications. LEDs offer advantages over traditional light sources, such as incandescent and fluorescent lamps, including long lifetime, high lumen efficacy, low operating voltage and fast modulation of lumen output.

Efficient high-power LEDs are often based on blue light emitting materials. To produce an LED based illumination device having a desired color (e.g. white) output, a suitable wavelength converting material, commonly known as a phosphor, may be used which converts part of the light emitted by the LED into light of longer wavelengths so as to produce a combination of light having desired spectral characteristics. The wavelength converting material may be applied directly on the LED die, or it may be arranged at a certain distance from the phosphor (so-called remote configuration). For example, the phosphor may be applied on the inside of a sealing structure encapsulating the device.

Many inorganic materials have been used as phosphor materials for converting blue light emitted by the LED into light of longer wavelengths. However, inorganic phosphors suffer from the disadvantages that they are relatively expensive. Furthermore, inorganic LED phosphors are light scattering particles, thus always reflecting a part of the incoming light, which leads to loss of efficiency in a device. Furthermore, inorganic LED phosphors have a relatively broad emission spectrum, in particular for the red emitting LED phosphors, which leads to additional efficiency losses. Currently, organic phosphor materials are being considered for replacing inorganic phosphor in LEDs where conversion of blue light to green to red light is desirable, for example for achieving white light output. Organic phosphors have the advantage that their luminescence spectrum can be easily adjusted with respect to position and band width. Organic phosphor materials also often have a high degree of transparency, which is advantageous since the efficiency of the lighting system is improved compared to systems using more light-absorbing and/or reflecting phosphor materials. Furthermore, organic phosphors are much less costly than inorganic phosphors. However, since organic phosphors are sensitive to the heat generated during electroluminescence activity of the LED, organic phosphors are preferentially used in remote configuration devices where the phosphor is placed at a distance away from the LEDs.

The main drawback hampering the application of organic phosphor materials in remote phosphor LED based lighting systems is their photo-chemical stability, which is poor. Organic phosphors have been observed to degrade quickly when illuminated with blue light in the presence of air.

US 2007/0273274 (Horiuchi et al.) discloses a translucent laminate sheet comprising a light-emitting device and comprising an organic phosphor arranged in an airproofed cavity formed by a frame member and two glass plates. The cavity is filled with the organic phosphor in a state where the concentration of oxygen is kept at 100 ppm and preferably at 20 ppm or less in a vacuum or ambient atmosphere of inert gas, to avoid deterioration of the phosphor.

However, in spite of the solution proposed in US 2007/0273274, there remains a need in the art for improved light-emitting arrangements in which deterioration of an organic phosphor is reduced or avoided.

SUMMARY OF THE INVENTION

It is an object of the present invention to overcome this problem, and to provide a light-emitting arrangement comprising an organic phosphor having improved lifetime.

It is also an object to the invention to provide a sealing structure for a light emitting arrangement in which an organic wavelength converting material may be maintained under low pressure.

According to a first aspect of the invention, this and other objects are achieved by a light-emitting arrangement comprising: a light source adapted to emit light of a first wavelength; a wavelength converting member comprising an organic wavelength converting material adapted to receive light of said first wavelength and to convert at least part of the received light to light of a second wavelength, said wavelength converting member and said light source being mutually spaced apart; and a sealing structure at least partially surrounding said wavelength converting member and forming a sealed cavity containing at least said wavelength converting member, the gas pressure within said sealed cavity being $1*10^{-5}$ bar (1 Pa) or less. At such pressure, the organic phosphor has been found to have particularly good stability, thus resulting in a longer life time of the phosphor. Preferably, the gas pressure within said sealed cavity is $1*10^{-8}$ bar (1 mPa) or less. Typically, the sealed cavity is hermetically sealed.

In embodiments of the invention, the sealed cavity may further comprise an adsorbant material, such as activated carbon. Activated carbon may adsorb a gaseous substance that enters the cavity in the case of a non-hermetic seal, or that is released from a component within the cavity. Hence the low gas pressure within the sealed cavity may be maintained during the operational lifetime of the light-emitting arrangement.

In embodiments of the invention, the sealing structure at least partially surrounds the light source, such that the sealed cavity also contains the light source. Thus, in such embodiments also the light source is kept under the same low pressure as the wavelength converting member.

In embodiments of the invention, the wavelength converting member comprises a wavelength converting material comprising a perylene derivative. In particular, the wavelength converting material may comprise a compound selected from the group consisting of perylene derivatives of the following general formula:

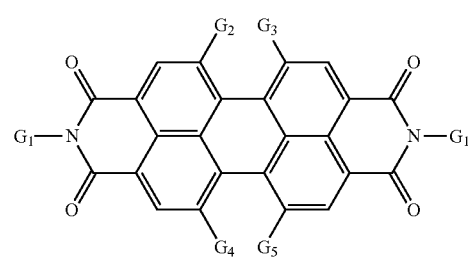

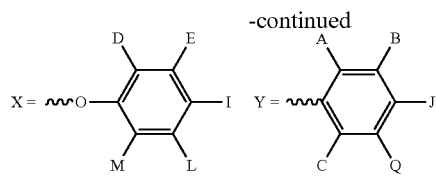

in which $G_1$ is a linear or branched alkyl group or oxygen-containing alkyl group $C_nH_{2n+1}O_m$, n being an integer from 1 to 44 and m<n/2, or Y;

each of A, B, C, J and Q independently is hydrogen, isopropyl, t-butyl, fluorine, methoxy, or unsubstituted saturated alkyl $C_nH_{2n+1}$, n being an integer from 1 to 16;

each of $G_2$, $G_3$, $G_4$ and $G_5$ independently is hydrogen, fluorine, methoxy, isopropyl, t-butyl, or unsubstituted saturated alkyl group $C_nH_{2n+1}$, n being an integer from 1 to 16, or X; and each of D, E, I, L and M independently is hydrogen, fluorine, methoxy, or unsubstituted saturated alkyl group $C_nH_{2n+1}$, n being an integer from 1 to 16.

In some embodiments, each of A and C is isopropyl, each of B, J and Q is hydrogen and each of D, E, I, L and M is hydrogen. This wavelength converting material was found to have excellent stability under low pressure compared to other perylene derived compounds.

In embodiments of the invention, the light source comprises at least one light-emitting diode (LED).

According to another aspect, the invention relates to a lamp comprising a light-emitting arrangement as described herein.

According to another aspect, the invention provides a method for producing a sealed structure enclosing a sealed cavity which contains a wavelength converting member under low pressure for use in a light-emitting arrangement. The method comprises steps of:

providing a structure intended to form a cavity;

arranging a wavelength converting member on or adjacent to said structure, such that the wavelength converting member is to be contained within said cavity;

closing the structure to form a sealing structure enclosing said cavity containing the wavelength converting member providing said cavity with an atmosphere having a gas pressure of 1 Pa or less; and hermetically sealing said closed sealing structure enclosing said cavity containing the wavelength converting member.

Typically, the step of sealing the closed sealing structure may be carried out using glass melting. Also, the previous step of closing of the sealing structure may be carried out using glass melting.

The step of providing the low gas pressure atmosphere typically comprises vacuum pumping.

In embodiments of the invention, a light source is provided before closing of the sealing structure, and arranged so as to be contained within the cavity, together with the wavelength converting member when the sealing structure is closed. Hence, a simple sealing structure may be used which encloses both the wavelength converting member and the light source. In general, the wavelength converting member and the light source are arranged mutually spaced apart.

In a further aspect, the invention provides a method for producing a light-emitting arrangement as described herein, comprising the steps of:

providing a light source adapted to emit light of a first wavelength;

providing a structure intended to form a cavity, arranging a wavelength converting member comprising an organic wavelength converting material on or adjacent to said structure such that the wavelength converting member is to be contained within said cavity;

closing the structure to form a sealing structure enclosing said cavity containing the wavelength converting member;

providing said cavity with an atmosphere having a gas pressure of 1 Pa or less; and hermetically sealing said sealing structure enclosing said cavity containing the wavelength converting member.

Typically, the wavelength converting member is arranged such that the wavelength converting member can receive light of said first wavelength emitted by the light source. In general, the wavelength converting member and the light source are arranged mutually spaced apart.

It is noted that the invention relates to all possible combinations of features recited in the claims.

BRIEF DESCRIPTION OF THE DRAWINGS

These and other aspects of the present invention will now be described in more detail, with reference to the appended drawings showing embodiment(s) of the invention.

DETAILED DESCRIPTION OF EMBODIMENTS

Figure 1A:
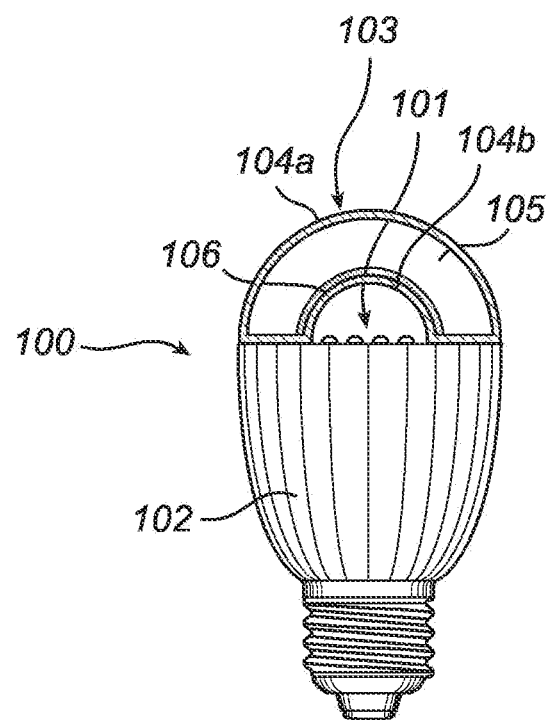
FIGS. 1a and 1b show two examples of a light-emitting arrangement according to embodiments of the invention.
Figure 1B:
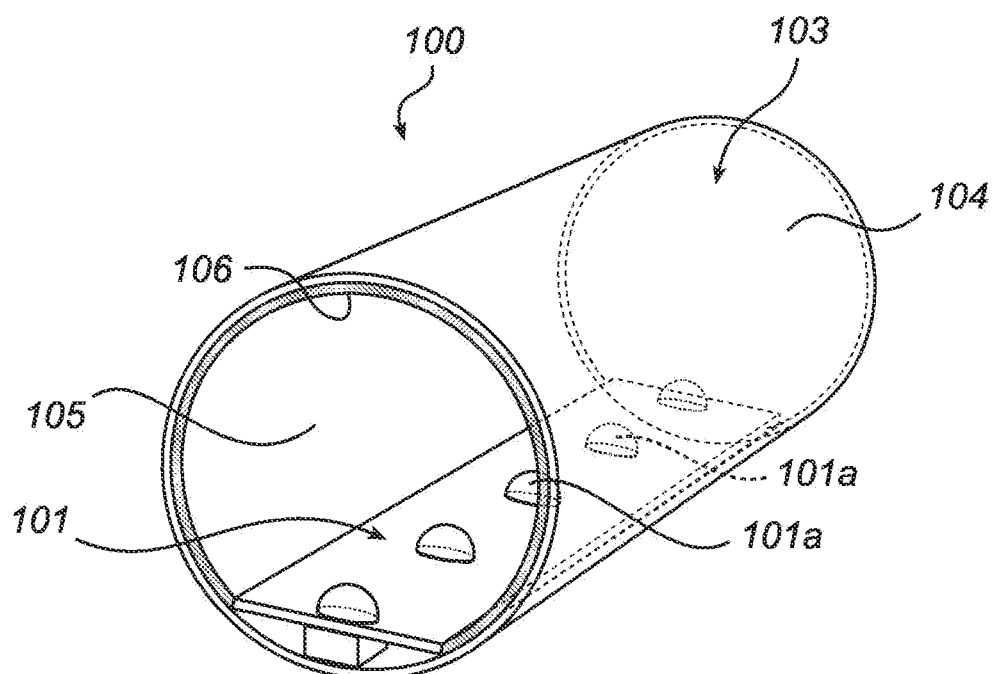

FIGS. 1a and 1b schematically illustrate two light-emitting arrangements 100 according to the invention. In both embodiments a plurality of LEDs 101 is arranged on a support 102. A sealing structure 103 comprising a light outlet member 104 and a seal 107 is arranged over the light source. The sealing structure 103 also defines a sealed cavity 105, in which is arranged a wavelength converting member 106 comprising an organic wavelength converting material, typically dispersed in a polymeric matrix or carrier.

The light-emitting arrangement 100 of FIG. 1a is provided as a retrofit lamp. The phrase retrofit lamp is well known to the person skilled in the art and refers to a LED based lamp having an outer appearance of an older type of lamp which did not have a LED. A light source comprising a plurality of LEDs 101 each comprising an electroluminescent layer connected to an anode and a cathode (not shown) is arranged on a base part 102, which is provided with a traditional cap, such as an Edison screw cap or a bayonet cap. A sealing structure 103 comprising a curved light outlet member 104 is arranged on the base part 102 over the LEDs 101. The curved member 104 has a double wall construction comprising an outer wall 104a and an inner wall 104b and encloses a cavity 105 formed between the walls 104a, 104b. The curved walls 104a, 104b are connected by a bottom wall portion which may be in direct or indirect contact with the base part 102.

A wavelength converting member 106 comprising an organic wavelength converting material is arranged within the cavity 105 as a coating on a surface of the curved member 104, i.e. a surface which faces the cavity 105. The LEDs are positioned under the curved member 104 in a different cavity 109 formed by the inner wall 104b and the base part 102.

In embodiments of the invention the wavelength converting member is arranged within the sealed cavity under low pressure, while the light source is arranged outside of said cavity and optionally maintained under a different pressure, typically atmospheric pressure.

The light outlet member 104 may be formed of a gas impermeable material and it may be sealed by a hermetic seal. Thus, the sealing structure 103 may provide an airtight barrier between the cavity 105 and the outside atmosphere surrounding the sealing structure 103. According to the present invention, the gas pressure within the sealed cavity is $1*10^{-5}$ bar (corresponding to 1 Pa) or less.

FIG. 1b illustrates another embodiment of the light-emitting arrangement, in which the sealing structure 103 comprises a light outlet member 104 having a cylindrical shape, resembling a traditional fluorescent tube. Both ends of the tube 104 are closed by end caps (not shown) and sealed. The wavelength converting member 106 is in this embodiment provided as a coating of the inner surface of the light outlet member 104, i.e. on the side of the tube 104 facing the sealed cavity 105 and the LEDs 101.

It should be noted that throughout this application the sealing structure comprises one or more walls, which may be formed of glass, ceramic, metal or a polymeric material optionally with a barrier coating or film. The sealing structure may be at least partly light transmissive.

Figure 2:
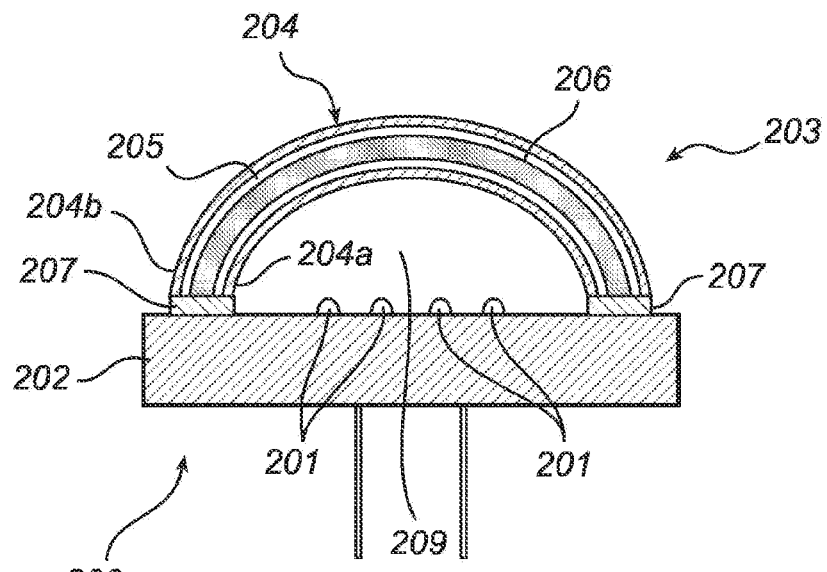
FIG. 2 shows a light-emitting arrangement according to another embodiment of the invention.

FIG. 2 illustrates another light-emitting arrangement 200 comprising a light source in the form of a plurality of LEDs 201 arranged on a base part 202, and a dome-shaped sealing structure 203 in the form of a light outlet member 204 enclosing the LEDs 201. In this embodiment the light outlet member comprises a sandwich structure of an inner wall 204a forming an inner barrier, and an outer wall 204b forming an outer barrier, and the remote wavelength converting member 206 is arranged between the outer wall 204b and the inner wall 204a. The outer and inner walls 204b, 204a are connected with the base part and with each other by means of a seal 207 extending along circumferential edge portions of the inner and outer walls. The light outlet member 204 thereby forms the sealed cavity 205 between the mutually spaced inner and outer walls 204a, 204b. The sealed cavity 205 containing the wavelength converting member 206 is separate from the compartment 209 formed by the sealing structure 203 and the base part 202 and containing the LEDs 201. Since there are no particularly oxygen sensitive components within the further compartment 209 it does not require a special environment or atmosphere, but may contain air or an inert gas at normal atmospheric pressure. However it is also possible to initially provide the compartment 209 with the same atmosphere and/or pressure as the cavity 205, since the compartment 209 is in fact sealed from the environment by the seal 207, because it is additionally used to attach the light outlet member 204 to the base part 202. This seal can be formed from a low melting glass or metal.

It is contemplated that two or more wall portions may be used to form the sealing structure 203. Also, the walls 204a, 204b need not be hemispherical, dome-shaped or even curved, but may have any suitable shape, and may for example comprise a plurality of portions.

The sealing structure may be formed of glass, ceramic, metal or a polymeric material optionally with a barrier coating or film. The sealing structure may be at least partly light transmissive. For, example, in the embodiments of FIGS. 1 and 2 the light outlet member is formed of a light transmissive material. Also, the base 202 may be formed of glass, ceramic, or metal.

Figure 5:
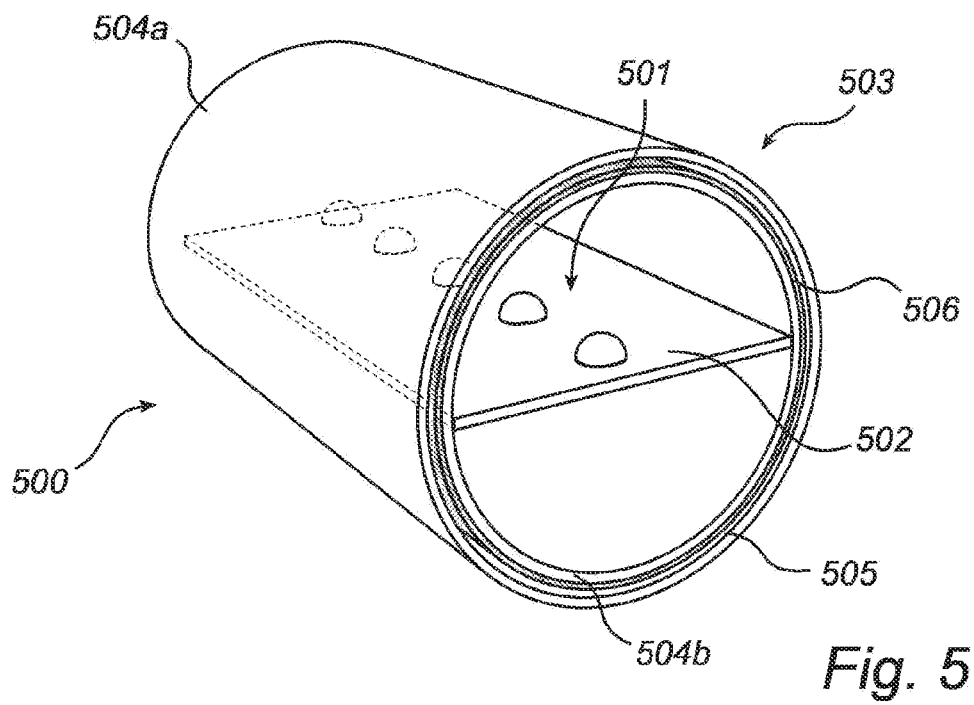
FIG. 5 shows a light-emitting arrangement according to another embodiment of the invention.

FIG. 5 shows another embodiment of the light-emitting arrangement according to the invention. The light-emitting arrangement 500 comprises a plurality of LEDs 501a arranged on a support plate 502 and surrounded by a sealing structure 503. The support plate 502 may be provided with a highly reflective coating. Using diffusers and/or reflectors within or on the device is also possible.

The sealing structure 503 comprises two concentrical tubes, one outer tube 504a concentrically surrounding an inner tube 504b so as to form an annular space between the tubes. The tubes 504a, 504b may be sealed at each end such that the annular space forms a sealed cavity 505. The light source 501 comprising a plurality of LEDs is arranged on a support plate within the inner tube 504b. A wavelength converting member 506 is provided as a coating on the outer surface of the inner tube 504b, which surface faces the outer tube 504a and the cavity 505. The cavity 505 formed between the concentric tubes 504a, 504b contains a controlled atmosphere, having a gas pressure within the sealed cavity of $1*10^{-5}$ bar (corresponding to 1 Pa) or less.

The light-emitting arrangement according to the invention may be manufactured using conventional glass melting technology for example as used in producing fluorescent light tubes.

The wavelength converting member according to embodiments of the invention may comprise a polymeric matrix or carrier for the organic wavelength converting material. Examples of suitable polymeric material for the matrix comprise poly(methyl methacrylate) (PMMA), polystyrene, polycarbonate, silicone, polysiloxane, and acrylate polymers.

The wavelength converting material used in the light-emitting arrangement according to the present invention may be any conventional organic phosphor. For example, the wavelength converting material may comprise a luminescent organic compound, such as a perylene derivative. In particular, perylene derivatives having the following general formula may be used in the light-emitting arrangement according to the invention:

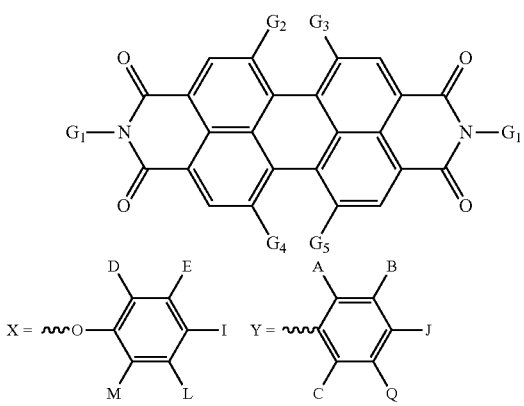

in which $G_1$ is a linear or branched alkyl group or oxygen-containing alkyl group $C_nH_{2n+1}O_m$, n being an integer from 1 to 44 and m<n/2, or Y;

each of A, B, C, J and Q independently is hydrogen, isopropyl, t-butyl, fluorine, methoxy, or unsubstituted saturated alkyl $C_nH_{2n+1}$, n being an integer from 1 to 16;

each of $G_2$, $G_3$, $G_4$ and $G_5$ independently is hydrogen, fluorine, methoxy, isopropyl, t-butyl, or unsubstituted saturated alkyl group $C_nH_{2n+1}$, n being an integer from 1 to 16, or X; and each of D, E, I, L and M independently is hydrogen, fluorine, methoxy, or unsubstituted saturated alkyl group $C_nH_{2n+1}$, n being an integer from 1 to 16.

Phosphor compounds corresponding to the general formula above were tested and found to have good stability compared to other organic phosphors, including other perylene derived organic phosphors.

For example, the wavelength converting material may comprise at least one of the following compounds I-III:

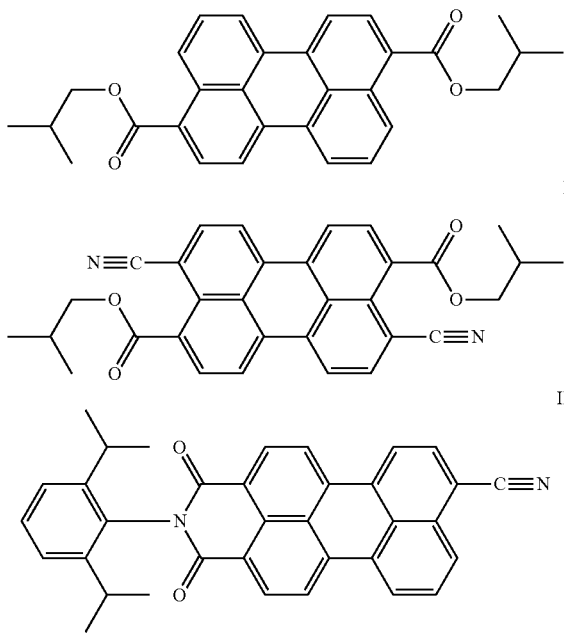

According to embodiments of the invention, the sealed cavity may contain a reactant or adsorbent material which operates at low pressure and helps to maintain the low pressure. For example, the cavity may contain activated carbon. Activated carbon may adsorb a gaseous substance that enters the cavity in the case of a non-hermetic seal, or that is released from a component within the cavity.

A method of producing the light-emitting arrangement, and in particular the sealing structure containing the wavelength converting member, will now be described. The wavelength converting member is arranged within a cavity formed by the not yet sealed sealing structure, which may be comprised of several portions or walls; optionally the portions (e.g. tubes 504a, 504b) are first brought together to create the cavity. Alternatively, where the wavelength converting member is provided as a coating on a surface of the sealing structure, the wavelength converting member may be arranged on a part of the sealing structure (e.g. the inner tube 504b of the embodiment of FIG. 5) and subsequently different portions (e.g. the inner and outer tubes) of the sealing structure are brought together to form the cavity. Where the light source is also to be contained in the sealed cavity, the light source is also arranged so as to be enclosed by the sealing structure before sealing of the cavity. Next, a first sealing step is carried out, leaving a small opening in the seal which may be connected to a vacuum pump. For example, referring to the embodiment of FIG. 1b, glass caps are melted onto both ends of the tube, one of the caps being provided with a small opening connected via a glass tube to a vacuum pump. Using a vacuum pump, the cavity is brought to the desired low pressure. Subsequently, the glass cap is melted to hermetically seal the sealing structure enclosing the cavity.

EXAMPLE

Figure 3:
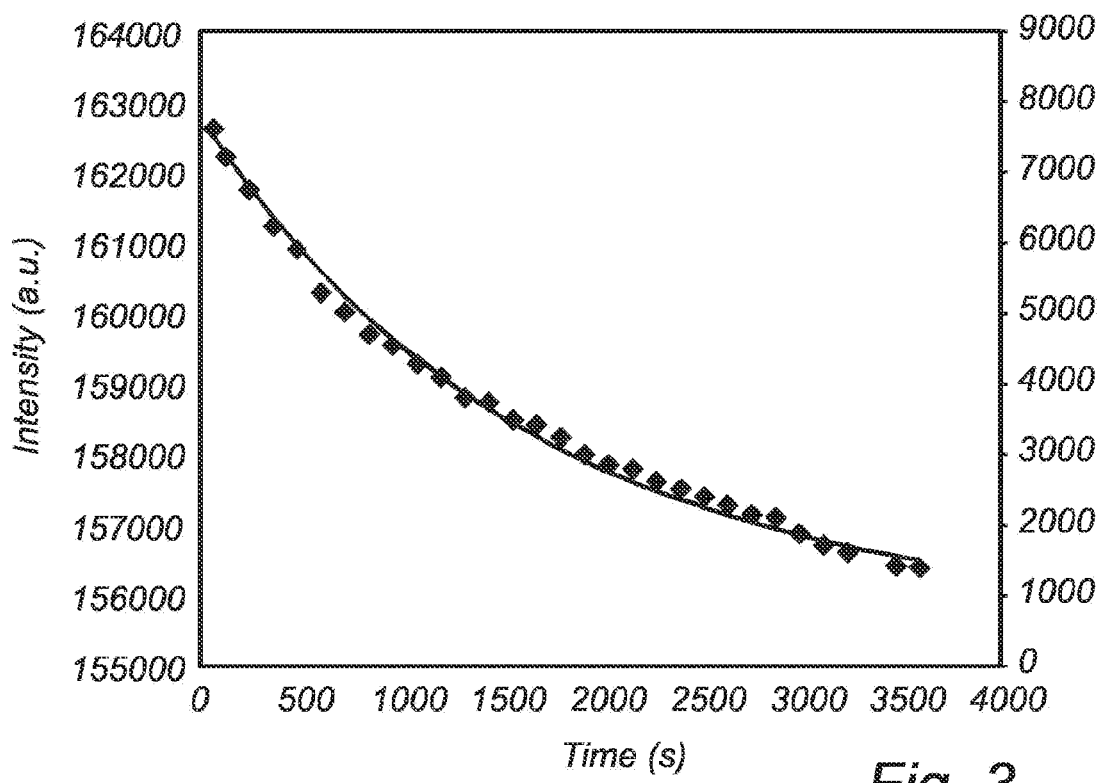
FIG. 3 is a graph showing the degradation of an organic phosphor illuminated with blue light under atmospheric pressure.

A layer of organic phosphor in a polymer matrix was illuminated by a laser emitting light of 450 nm with a flux density of 4.2 W/cm², and the resulting emission from the phosphor is shown as a function of time in FIG. 3. Due to degradation of the phosphor under blue light irradiation, the emission intensity decreases with time. The initial absorption in the layer is 10% and thus the intensity decrease can be directly related to the concentration of phosphor molecules that have degraded and thus no longer emit light. It can be seen that the change in light intensity is an exponential function of time, $c(t)=c(0)*e^{-kt}$, with a decay constant k corresponding to the degradation rate of the organic phosphor compound.

The present inventors investigated the decay rate of a yellow luminescent dye and a perylene derived red luminescent dye at 120° C. under different pressures. The concentration of the phosphor was 0.1% The result is presented in FIG. 4. The yellow emitting dye was a commercial perylene dye, Lumogen® F-083 (available from BASF), at 0.04% by weight in a PMMA matrix, and the red emitting dye was Lumogen® F-305 (commercially available from BASF) at a content 0.1% by weight in a PMMA matrix. The yellow-emitting dye was illuminated with blue light at a flux density of 4.2 W/cm², and the red-emitting dye was illuminated with blue light at a flux density of 1.2 W/cm². At normal atmospheric pressure pure nitrogen atmosphere was used.

Figure 4:
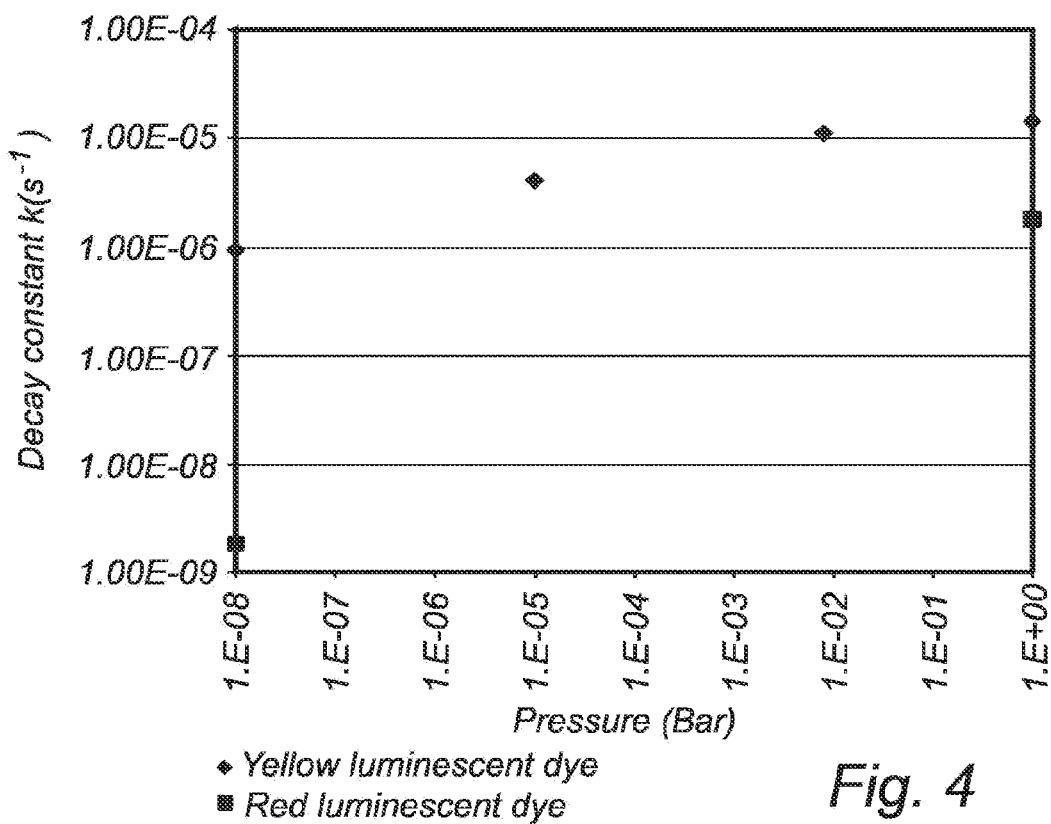
FIG. 4 is a graph showing the decay rate of two organic phosphors illuminated with blue light at different pressures.

As can be seen in FIG. 4, at a pressure of $10^{-8\ bar}$ (1 mPa), the decay rate of the red-emitting phosphor is three orders of magnitude lower compared to normal atmospheric pressure. For the yellow-emitting phosphor, a pressure of $10^{-8}$ bar resulted in a decay rate which was more than one order of magnitude lower than the decay rate under normal atmospheric pressure, and also at a pressure of $10^{-5}$ bar (1 Pa) the decay rate was considerably lower compared to normal pressure.

The person skilled in the art realizes that the present invention by no means is limited to the preferred embodiments described above. On the contrary, many modifications and variations are possible within the scope of the appended claims.

The invention claimed is:
1. A light-emitting arrangement, comprising:
a light source adapted to emit light of a first wavelength, and
a wavelength converting member comprising an organic wavelength converting material adapted to receive light of said first wavelength and to convert at least part of the received light to light of a second wavelength, wherein the wavelength converting member comprises a polymeric matrix or carrier for the organic wavelength converting material, said wavelength converting member and said light source being mutually spaced apart; and
a sealing structure at least partially surrounding said wavelength converting member and forming a sealed cavity containing at least said wavelength converting member, the gas pressure within said sealed cavity being 1 Pa or less.

2. A light-emitting arrangement according to claim 1, wherein the gas pressure within said sealed cavity is 1 mPa or less.

3. A light-emitting arrangement according to claim 1, wherein the sealed cavity is hermetically sealed.

4. A light-emitting arrangement according to claim 1, wherein the sealed cavity further comprises an adsorbent material.

5. A light-emitting arrangement according to claim 1, wherein the sealed cavity also contains the light source.

6. A light-emitting arrangement according to claim 1, wherein said wavelength converting member comprises a wavelength converting material comprising a perylene derivative.

7. A light-emitting arrangement according to claim 6, wherein said wavelength converting material is selected from the group consisting of perylene derivatives of the following general formula:

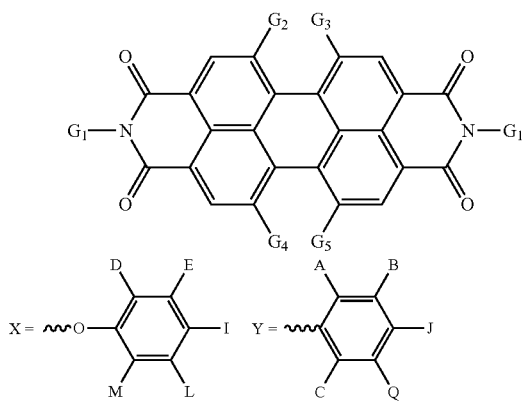

in which
G$_1$ is a linear or branched alkyl group or oxygen-containing alkyl group C$_n$H$_{2n+1}$O$_m$, n being an integer from 1 to 44 and m<n/2, or Y;
each of A, B, C, J and Q independently is hydrogen, isopropyl, t-butyl, fluorine, methoxy, or unsubstituted saturated alkyl C$_n$H$_{2n+1}$, n being an integer from 1 to 16;
each of G$_2$, G$_3$, G$_4$ and G$_5$ independently is hydrogen, fluorine, methoxy, isopropyl, t-butyl, or unsubstituted saturated alkyl group C$_n$H$_{2n+1}$, n being an integer from 1 to 16, or X; and
each of D, E, I, L and M independently is hydrogen, fluorine, methoxy, or unsubstituted saturated alkyl group C$_n$H$_{2n+1}$, n being an integer from 1 to 16.

8. A light-emitting arrangement according to claim 7, wherein each of G$_2$, G$_3$, G$_4$ and G$_5$ is X, each of A and C is isopropyl, and each of B, J, Q, D, E, I, L and M is hydrogen.

9. A light-emitting arrangement according to claim 1, wherein said light source comprises at least one LED.

10. A method for producing a sealed cavity containing a wavelength converting member under low pressure for use in a light-emitting arrangement, comprising:
providing a structure intended to form a cavity;
arranging a wavelength converting member comprising an organic wavelength converting material on or adjacent to said structure, such that the wavelength converting member is to be contained within said cavity, wherein the wavelength converting member comprises a polymeric matrix or carrier for the organic wavelength converting material;
closing the structure to form a sealing structure enclosing said cavity containing the wavelength converting member;
providing said cavity with an atmosphere having a gas pressure of 1 Pa or less; and
hermetically sealing said closed sealing structure enclosing said cavity containing the wavelength converting member.

11. A method according to claim 10, wherein said step of closing the structure and/or said step of sealing the closed structure is carried out using glass melting.

12. A method according to claim 10, wherein said step of providing said cavity with an atmosphere having a gas pressure of 1 Pa or less comprises vacuum pumping.

13. A method according to claim 10, wherein a light source is provided before the step of closing said structure, said light source being arranged so as to be contained, after closing of the structure, within the cavity.

14. A method for producing a light-emitting arrangement according to claim 1, comprising:
providing a light source adapted to emit light of a first wavelength;
providing a structure intended to form a cavity;
arranging a wavelength converting member comprising an organic wavelength converting material on or adjacent to said structure such that the wavelength converting member is to be contained within said cavity, wherein the wavelength converting member comprises a polymeric matrix or carrier for the organic wavelength converting material;
closing the structure to form a sealing structure enclosing said cavity containing the wavelength converting member;
providing said cavity with an atmosphere having a gas pressure of 1 Pa or less; and
hermetically sealing said sealing structure enclosing said cavity containing the wavelength converting member.

15. A light-emitting arrangement according to claim 1, wherein the polymeric material for the matrix comprises a poly(methyl methacrylate) (PMMA), polystyrene, polycarbonate, silicone, polysiloxane, or an acrylate polymer.

* * * * *